United States Patent
Allen et al.

(10) Patent No.: US 9,575,274 B2
(45) Date of Patent: Feb. 21, 2017

(54) FIBER MANAGEMENT STRUCTURE HAVING A SPLICE TRAY WITH MODULAR ELEMENTS

(71) Applicant: COMMSCOPE TECHNOLOGIES LLC, Hickory, NC (US)

(72) Inventors: Barry Wayne Allen, Siler City, NC (US); Thomas Ross Marmon, Angier, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 97 days.

(21) Appl. No.: 14/631,481

(22) Filed: Feb. 25, 2015

(65) Prior Publication Data

US 2015/0241654 A1    Aug. 27, 2015

Related U.S. Application Data

(60) Provisional application No. 61/944,341, filed on Feb. 25, 2014.

(51) Int. Cl.
*G02B 6/44* (2006.01)

(52) U.S. Cl.
CPC .......... *G02B 6/4454* (2013.01); *G02B 6/4471* (2013.01)

(58) Field of Classification Search
CPC .................................................. G02B 6/4454
USPC .......................................... 385/130–139, 147
See application file for complete search history.

(56) References Cited

U.S. PATENT DOCUMENTS

| 7,970,249 | B2 | 6/2011 | Solheid et al. | |
| 8,009,954 | B2 | 8/2011 | Bran de Leon et al. | |
| 2008/0116153 | A1* | 5/2008 | Smith | G02B 6/4452 211/26.2 |
| 2009/0110359 | A1* | 4/2009 | Smith | G02B 6/445 385/135 |
| 2009/0252472 | A1* | 10/2009 | Solheid | G02B 6/4447 385/135 |
| 2009/0290842 | A1* | 11/2009 | Bran de Leon | G02B 6/4455 385/135 |

(Continued)

FOREIGN PATENT DOCUMENTS

EP          2 535 750 A1     12/2012
KR    10-2009-0068517 A       6/2009

(Continued)

OTHER PUBLICATIONS

International Search Report and Written Opinion for Application No. PCT/US2015/017484 mailed May 28, 2015.

*Primary Examiner* — Akm Enayet Ullah
(74) *Attorney, Agent, or Firm* — Merchant & Gould P.C.

(57) ABSTRACT

Aspects of the present disclosure relate to a fiber management structure including a splice tray. The splice tray includes a front side and a back side. The fiber management structure includes a first attachment module that mounts by a location-selectable connection to the splice tray at a selected mounting location. The selected mounting location being one of a plurality of different mounting locations at which the first attachment module can be mounted to the splice tray. The first attachment module includes a fiber containment wall that projects upwardly from the front side of the splice tray when the first attachment module is mounted to the splice tray.

34 Claims, 9 Drawing Sheets

(56) References Cited

U.S. PATENT DOCUMENTS

| | | | |
|---|---|---|---|
| 2010/0061693 A1* | 3/2010 | Bran de Leon | G02B 6/4454 |
| | | | 385/135 |
| 2010/0284661 A1 | 11/2010 | Bran de Leon et al. | |
| 2011/0180295 A1* | 7/2011 | Krietzman | H02G 3/0475 |
| | | | 174/50 |
| 2013/0243386 A1* | 9/2013 | Pimentel | G02B 6/4441 |
| | | | 385/135 |
| 2014/0193129 A1* | 7/2014 | Bryon | G02B 6/4469 |
| | | | 385/135 |
| 2014/0219622 A1* | 8/2014 | Coan | G02B 6/445 |
| | | | 385/135 |
| 2016/0109671 A1* | 4/2016 | Coan | G02B 6/445 |
| | | | 385/135 |

FOREIGN PATENT DOCUMENTS

| | | |
|---|---|---|
| WO | WO 2004/047462 A2 | 6/2004 |
| WO | WO 2006/110342 A1 | 10/2006 |

* cited by examiner

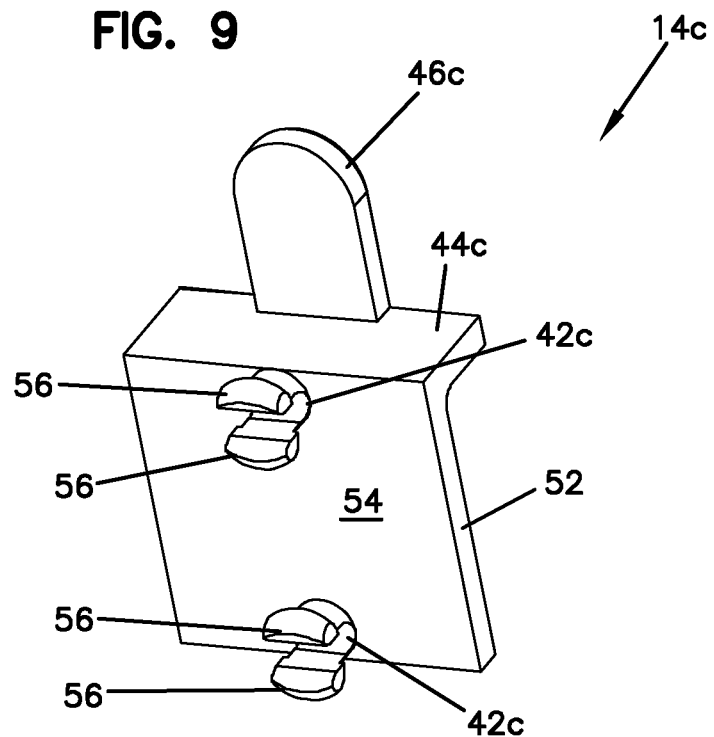
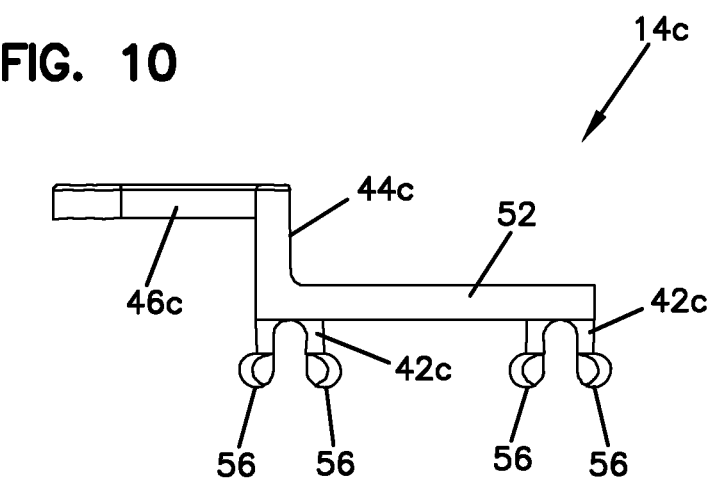

FIBER MANAGEMENT STRUCTURE HAVING A SPLICE TRAY WITH MODULAR ELEMENTS

CROSS-REFERENCE TO RELATED APPLICATION

The present application claims the benefit of U.S. Provisional Patent Application Ser. No. 61/944,341, filed Feb. 25, 2014, which application is hereby incorporated by reference in its entirety.

TECHNICAL FIELD

The present disclosure relates generally to devices and methods for enhancing cable management of a telecommunications system. More particularly, the present invention relates to a fiber management structure for managing cables of telecommunications systems.

BACKGROUND

Telecommunications systems utilize cables, such as fiber optic cables or copper twisted pair cables, for interconnecting pieces of telecommunications equipment or components. The systems commonly include telecommunication racks that hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the occupied space, and routing cables in an orderly manner so as to reduce the likelihood of cable tangling. Ease of cable organization is also a factor related to effective cable management.

Cable management is also important in preventing damage to the cables. Unnecessary or excessive bending of fiber optic cables, for example, is undesirable. Bending of fibers can cause attenuation and loss of signal strength. As the fiber bends, the fiber can also break, resulting in complete loss of signal transmission through the fiber.

In general, cable management improvement has been sought, generally to efficiently and effectively manage cables by providing system adaptability, and ease of cable organization, conventional arrangements for managing cable can be improved.

SUMMARY

One aspect of the present disclosure relates to a fiber management structure including a splice tray. The splice tray includes a front side and a back side and defines a plurality of openings that extend through the splice tray from the front side to the back side. The fiber management structure includes a first attachment module that mounts by a snap-fit connection to the splice tray at a selected mounting location defined by the plurality of openings. The selected mounting location being one of a plurality of different mounting locations defined by the plurality of openings at which the first attachment module can be mounted to the splice tray. The first attachment module includes a fiber containment wall that projects upwardly from the front side of the splice tray when the first attachment module is mounted to the splice tray.

Another aspect of the present disclosure relates to a fiber management structure including a splice tray having a front side and a back side. The splice tray defines a plurality of openings that extend through the splice tray from the front side to the back side. The fiber management structure includes an attachment module that mounts by a snap-fit connection to the splice tray at a selected mounting location defined by the plurality of openings. The selected mounting location being one of a plurality of different mounting locations defined by the plurality of openings at which the attachment module can be mounted to the splice tray. The attachment module includes a bottom wall being planar and constructed of a substantially non-rigid material, the bottom wall having an inner surface. The attachment module includes a top wall being planar and constructed of a substantially non-rigid material, the top wall having an inner surface. The top wall having substantially a same height and a same width as the bottom wall such that each edge of the bottom wall is aligned with a corresponding edge of the top wall. The bottom wall and the top wall define an interior cavity between the inner surface of the bottom wall and the inner surface of the top wall. The bottom and top walls include locating elements positioned on the inner surfaces of the bottom and top walls. The attachment module includes a fiber containment wall projecting upwardly from the front side of the splice tray when the attachment module is mounted to the splice tray. A fiber management tab projecting outwardly from the fiber containment wall and opposing the front side of the splice tray. The splice tray is positioned within the interior cavity and the locating elements of the bottom and top walls of the attachment module engage one of the plurality of openings in the splice tray permitting the attachment module to be mounted to the splice tray at the selected mounting location defined by the plurality of openings.

Another aspect of the present disclosure relates to a fiber management structure including a fiber management structure including a splice tray. The splice tray includes a front side and a back side. The splice tray defines a plurality of openings that extend through the splice tray from the front side to the back side. The fiber management structure includes a first attachment module that mounts by a snap-fit connection to the splice tray at a selected mounting location defined by the plurality of openings. The selected mounting location being one of a plurality of different mounting locations defined by the plurality of openings at which the first attachment module can be mounted to the splice tray. The first attachment module includes a flange having a bottom surface, the bottom surface including locating elements. The first attachment module includes a fiber containment wall that projects upward from the front side of the splice tray when the first attachment module is mounted to the splice tray. A fiber management tab projecting outwardly from the fiber containment wall and opposing the front side of the splice tray. The locating elements of the first attachment module are configured to engage one of the plurality of openings in the splice tray permitting the first attachment module to be mounted to the splice tray at the selected mounting location.

Yet another aspect of the present disclosure relates to a fiber management structure including a splice tray. The splice tray includes a front side and a back side. The fiber management structure includes a first attachment module that mounts by a location-selectable connection to the splice tray at a selected mounting location. The selected mounting location being one of a plurality of different mounting locations at which the first attachment module can be mounted to the splice tray. The first attachment module includes a fiber containment wall that projects upwardly from the front side of the splice tray when the first attachment module is mounted to the splice tray.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 9 is a bottom perspective view of the attachment module shown in FIG. 5;

FIG. 10 is a side perspective view of the attachment module shown in FIG. 5;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Cable management systems can include splice trays with walls integrated or coupled thereon to contain numerous cables. In some instances the splice trays include splice tray assemblies to help manage and organize the cables on the splice trays. As such, the splice tray assemblies and the walls of the splice tray can each help to hold or retain the cables on the splice tray. In other cable management systems, the splice trays can be configured without any walls integrated or coupled to the splice tray so that the splice tray may be arranged or configured as desired.

Figure 1:
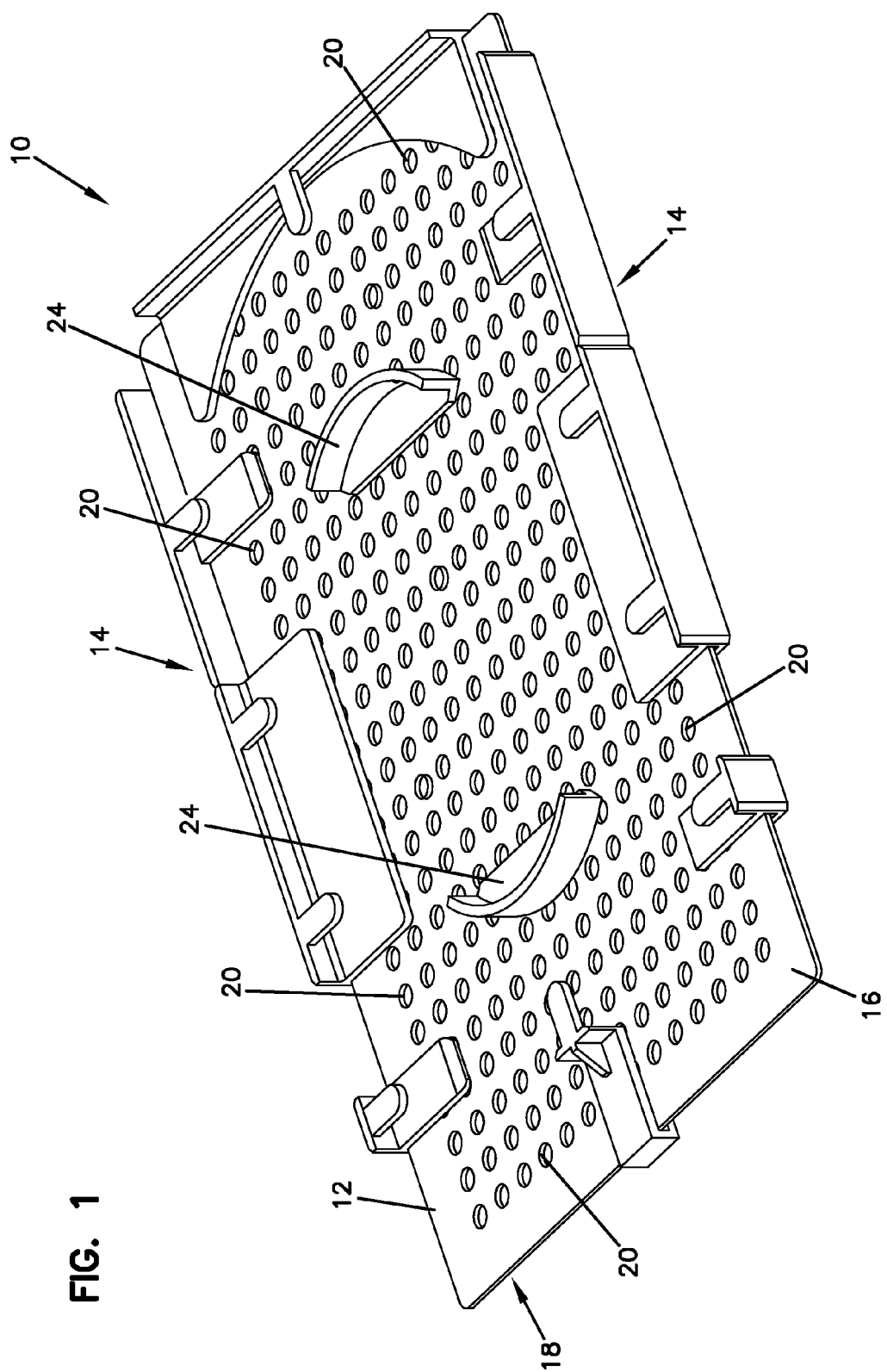
FIG. 1 is a perspective view of a fiber management structure in accordance with the principles of the present disclosure, attachment modules are shown attached to a splice tray of the fiber management structure.

Referring now to FIG. 1, an example of a fiber management structure, generally designated 10, is shown. In one example, the fiber management structure 10 includes a splice tray 12 and a plurality of attachment modules 14 that can mount by a location-selectable connection. In other examples, the plurality of attachments 14 can be mounted by a snap-fit connection, a clip-on connection, or a friction-fit connection to the splice tray 12. The splice tray 12 includes a front side 16 and a back side 18. In the depicted example, the splice tray 12 is a single flat plate that defines a plurality of openings 20 that extend through the splice tray 12 from the front side 16 to the back side 18. In other examples, the splice tray 12 may include multiple plates that can define a plurality of openings 20. The plates may be planar or some other shape. The plurality of openings 20 can be of any size or shape. For example, the splice tray 12 may be any size (small, medium, large, etc.) and the plurality of openings 20 can have a square or round shape. In one example, the splice tray 12 is less than about 100 square inches.

The plurality of attachment modules 14 can provide the customer or end user with the flexibility of laying out the splice tray 12 as desired in order to fit their needs. The end user can build the splice tray 12 with a wide variety of attachment modules to select from in order to meet their specific requirements. The splice tray 12 can be subject to change at any time by the customer or end user whenever needed. New attachment modules of any size, shape, or configuration can be designed and used with the splice tray 12.

In one example, the splice tray 12 of the fiber management structure 10 may be 100 percent customizable. The splice tray 12 can be a planar plate with openings for adding attachment modules to create a customizable fiber management structure. The attachment modules can be added anywhere on the splice tray 12 as desired. In other examples, the splice tray 12 of the fiber management structure 10 may already include integrated features, such as, walls, around the splice tray 12 such that the fiber management structure 10 is not 100 percent customizable. The splice tray 12 may still be customized by adding attachment modules to the integrated features on the splice tray 12 as desired by the customer or end user.

An exemplary splice tray has been described in U.S. patent application Ser. Nos. 61/039,045 (now U.S. patent application Ser. No. 12/370,040), which was filed on Mar. 24, 2008, 61/046,678 (now U.S. patent application Ser. No. 12/425,241), which was filed on Apr. 21, 2008, 61/147,933 (now U.S. patent application Ser. No. 12/425,241), which was filed on Jan. 28, 2009, and 61/167,150 (now U.S. patent application Ser. No. 12/754,801), which was filed on Apr. 6, 2009. The disclosures of the above identified applications are hereby incorporated by reference in their entirety.

Figure 2:
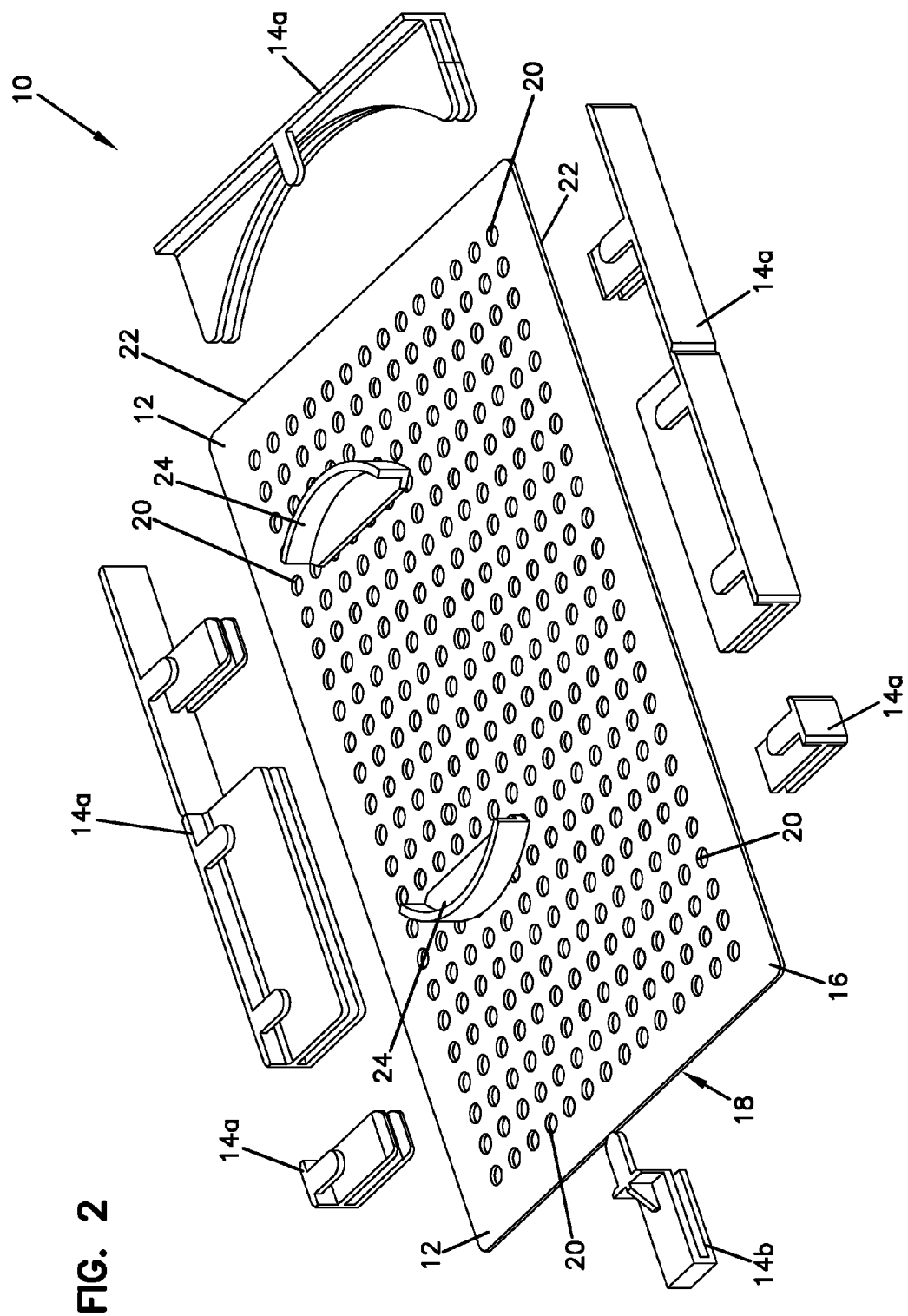
FIG. 2 is an exploded view of the fiber management structure of FIG. 1, the attachment modules are shown in a position prior to being attached to the splice tray of the fiber management structure.

Referring now to FIG. 2, an exploded view of FIG. 1 is shown. As depicted, the splice tray 12 is a blank and planar tray shown with the plurality of attachment modules 14 detached therefrom such that no retaining walls are formed around a perimeter 22 of the splice tray 12. In other examples, the splice tray 12 may include retaining walls that can be integrated together or coupled with the splice tray 12 and include the plurality of attachments modules 14 thereon.

In one example, the plurality of attachment modules 14 may include end wall modules 14*a*, internal wall modules 14*b*, tab modules 14*c*, hinge modules 14*d*, and other types of modules that can mount to the splice tray 12 by a location-selectable connection. In one example, the plurality of attachment modules 14 can be mounted by a snap-fit connection, a clip-on connection, or a friction-fit connection to the splice tray 12 at a selected mounting location defined by the plurality of openings 20. The selected mounting location can be one of a plurality of different mounting locations defined by the plurality of openings 20 at with the plurality of attachment modules 14 can be mounted to the splice tray 12. In another example, one of the plurality of attachment modules 14 can be a curve bend radius limiter 24 that can attach to the splice tray 12. In certain aspects, one of the plurality of attachment modules 14 can include a splice holder 26 (see FIGS. 12-13) that can attach to the splice tray 12. The curve bend radius limiter 24 and the splice holder 26 are illustrated and described in more detail with reference to FIGS. 12-13.

Figure 3:
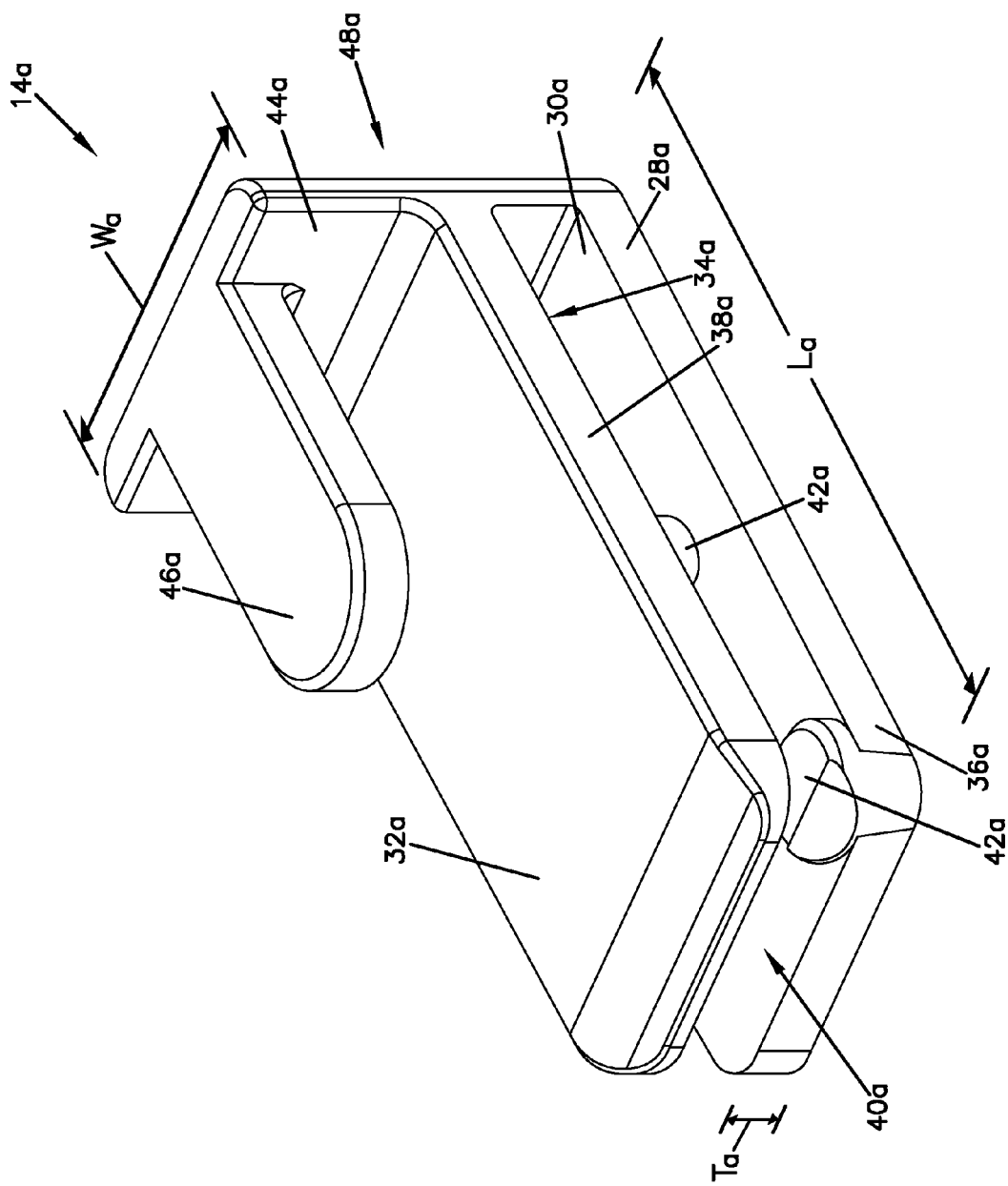
FIG. 3 is a front perspective view of one embodiment of an attachment module of the fiber management structure shown in FIG. 1.

Referring to FIG. 3, an example of the end wall module 14*a* is shown. The end wall module 14*a* can include a bottom wall 28*a* that is planar and constructed of a substantially non-rigid material. The bottom wall 28*a* can have an inner surface 30*a*. The end wall module 14*a* can include a top wall 32*a* that is planar and constructed of a substantially non-rigid material. The top wall 32*a* can have an inner surface 34*a*. By non-rigid material, the bottom and top walls 28*a*, 32*a* may be constructed of a material having elastic characteristics. In other examples, the bottom and top walls 28*a*, 32*a* may be constructed of a rigid material that has no elastic characteristics.

In one example, the top wall 32*a* can have substantially a same length $L_a$, a same width $W_a$, and a same thickness $T_a$ as the bottom wall 28*a* such that each edge 36*a* of the bottom wall 28*a* is aligned with a corresponding edge 38*a* of the top wall 32*a*. In the depicted example, the bottom wall 28*a* and the top wall 32*a* define an interior cavity 40*a* (e.g., slot) between the inner surface 30*a* of the bottom wall 28*a* and the inner surface 34*a* of the top wall 32*a*. In one aspect, the bottom and top walls 28*a*, 32*a* can each include locating elements 42*a* positioned on the inner surfaces 30*a*, 34*a* of the bottom and top walls 28*a*, 32*a*. In some examples, the locating elements 42*a* can project within the interior cavity 40*a* such that they locating elements 42*a* fit within one of the plurality of openings 20 of the splice tray 12. In certain examples, the locating elements 42*a* can be integrated with or coupled to the inner surfaces 30*a*, 34*a* of the bottom and top walls 28*a*, 32*a*.

In one example, the end wall module 14*a* can include a fiber containment wall 44*a* that can attach to the bottom and top walls 28*a*, 32*a* and project upward from the front side 16 of the splice tray 12 when the end wall module 14*a* is mounted to the splice tray 12. In other examples, the end wall module 14*a* can include a fiber management tab 46*a* that can project outwardly from the fiber containment wall 44*a* and oppose the front side 16 of the splice tray 12. In one aspect, the splice tray 12 can be positioned within the interior cavity 40*a* such that the locating elements 42*a* of the bottom and top walls 28*a*, 32*a* of the end wall module 14*a* can mount by a location-selectable connection to the splice tray 12. In one example, the end wall module 14*a* can be mounted by a snap-fit connection into one of the plurality of openings 20 in the splice tray 12 thereby permitting the end wall module 14*a* to be mounted to the splice tray 12 at the selected mounting location defined by the plurality of openings 20.

In one example, the end wall module 14*a* can be attached at the perimeter 22 of the splice tray 12 to create a retaining wall 48*a* thereon. The retaining wall 48*a* can be configured anywhere along the perimeter 22 of the splice tray 12 as desired. The retaining wall 48*a* can be arranged and configured to be any size. In certain examples, the width $W_a$ of the fiber containment wall 44*a* can vary to provide different widths of the retaining wall 48*a* to be used on the splice tray 12. In other examples, the end wall module 14*a* can be mounted to the splice tray 12 by, for example, a clip-on connection, a friction-fit connection, or some other type of connection. In certain examples, the end wall module 14*a* can be releasably connected to the splice tray 12. In other examples, the end wall module 14*a* can be permanently connected to the splice tray 12.

Figure 4:
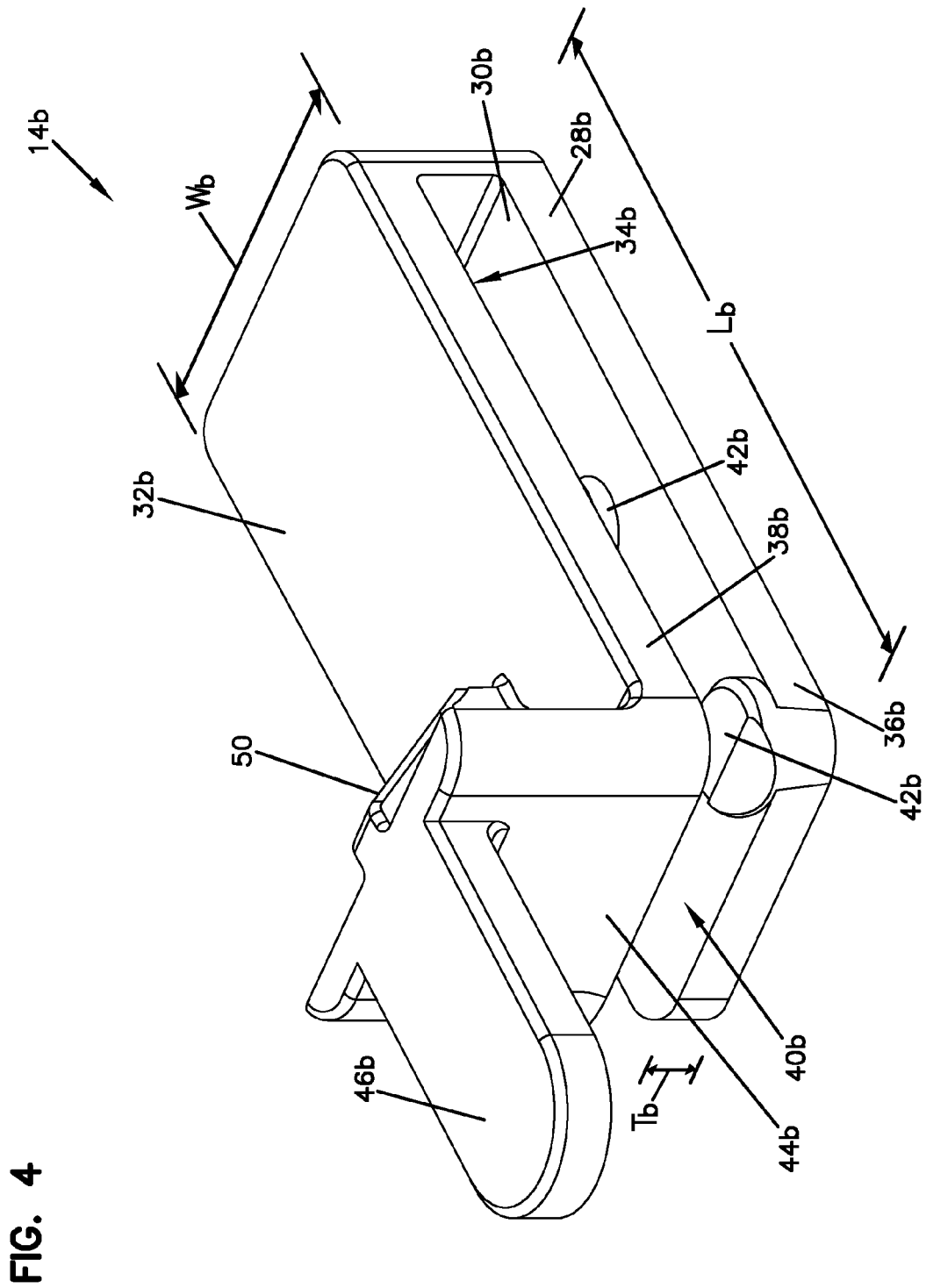
FIG. 4 is a front perspective view of another embodiment of an attachment module of the fiber management structure shown in FIG. 1.
Figure 5:
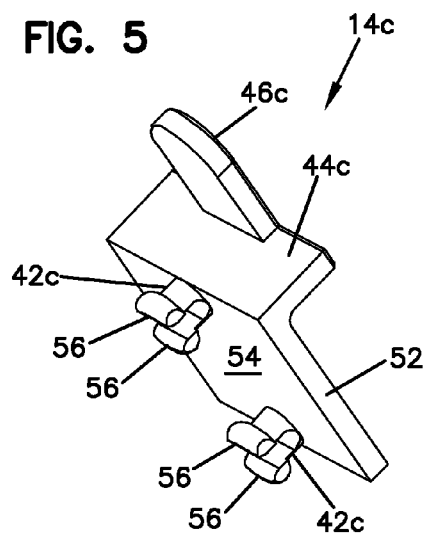
FIG. 5 is a bottom, side perspective view of still another embodiment of an attachment module of the fiber management structure shown in FIG. 1.
Figure 6:
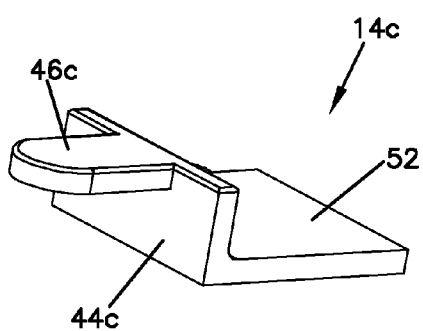
FIG. 6 is a rear perspective view of the attachment module shown in FIG. 5.
Figure 7:
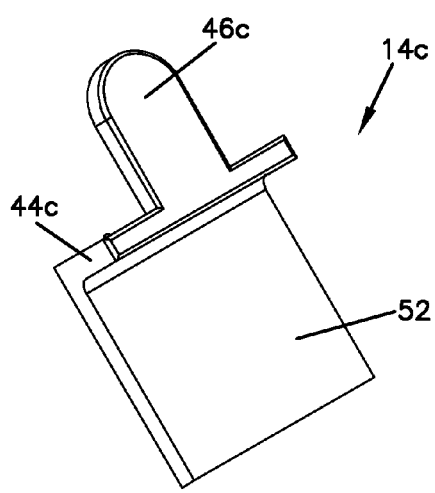
FIG. 7 is a top perspective view of the attachment module shown in FIG. 5.
Figure 8:
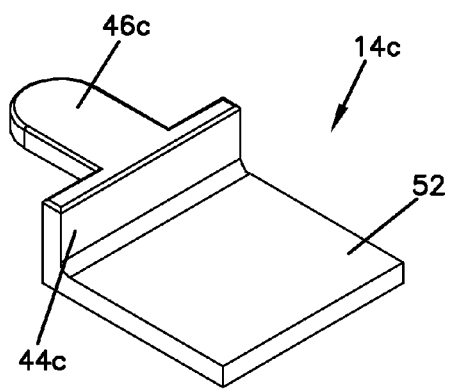
FIG. 8 is a front perspective view of the attachment module shown in FIG. 5.

Referring to FIG. 4, an example of the internal wall module 14*b* is shown. The internal wall module 14*b* can include a bottom wall 28*b* that is planar and constructed of a substantially non-rigid material. The bottom wall 28*b* can have an inner surface 30*b*. The internal wall module 14*b* can include a top wall 32*b* that is planar and constructed of a substantially non-rigid material. The top wall 32*b* can have an inner surface 34*b*. The top wall 32*b* can have substantially a same length $L_b$, a same width $W_b$, and a same thickness $T_b$ as the bottom wall 28*b* such that each edge 36*b* of the bottom wall 28*b* is aligned with a corresponding edge 38*b* of the top wall 32*b*. In one example, the internal wall module 14*b* may be offset from the perimeter 22 of the splice tray 12 by the dimension $L_b$ to create a retaining wall for fibers on the splice tray 12.

In the depicted example, the bottom wall 28*b* and the top wall 32*b* define an interior cavity 40*b* (e.g., slot) between the inner surface 30*b* of the bottom wall 28*b* and the inner surface 34*b* of the top wall 32*b*. In one aspect, the bottom and top walls 28*b*, 32*b* can each include locating elements 42*b* positioned on the inner surfaces 30*b*, 34*b* of the bottom and top walls 28*b*, 32*b*. In some examples, the locating elements 42*b* can project within the interior cavity 40*b* such that the locating elements 42*b* fit within one of the plurality of openings 20 of the splice tray 12. In other examples, the locating elements 42*b* can be integrated with or coupled to the inner surfaces 30*b*, 34*b* of the bottom and top walls 28*b*, 32*b*.

In certain examples, the internal wall module 14*b* can include a fiber containment wall 44*b* that can attach to the top wall 32*b* and project upward from the front side 16 of the splice tray 12 when the internal wall module 14*b* is mounted to the splice tray 12. In other examples, the internal wall module 14*b* can include a fiber management tab 46*b* that projects outward from the fiber containment wall 44*b* and opposes the front side 16 of the splice tray 12. The fiber management tab 46*b* can include a rib 50 that is constructed to help support or anchor the fiber management tab 46*b* to the top wall 32*b*.

In one example, the splice tray 12 can be positioned within the interior cavity 40*b* of the internal wall module 14*b* such that the locating elements 42*b* of the bottom and top walls 28*b*, 32*b* of the internal wall module 14*b* can mount by a location-selectable connection to the splice tray 12. In other examples, the internal wall module 14*b* can be mounted by a snap-fit connection into one of the plurality of openings 20 in the splice tray 12 thereby permitting the internal wall module 14*b* to be mounted to the splice tray 12 at the selected mounting location defined by the plurality of openings 20.

In one example, the internal wall module 14*b* can be mounted on the splice tray 12 anywhere inside the perimeter 22 of the splice tray 12 as desired by the customer or end user. In one example, the internal wall module 14b can be mounted to the splice tray 12 by, for example, a clip-on connection, a friction-fit connection, or other type of connection. In certain examples, the internal wall module 14b can be releasably connected to the splice tray 12. In other examples, the internal wall module 14b can be permanently connected to the splice tray 12.

Referring to FIGS. 5-10, an example of the tab module 14c is shown. The tab module 14c can include a flange 52 having a bottom surface 54. In one example, the bottom surface can include locating elements 42c. In the depicted example, the locating elements 42c can include a pair of knob feet 56. The locating elements 42c can be made of metal (e.g., steel) or other material with elastic characteristics. The locating elements 42c can have elastic characteristics that allow the pair of knob feet 56 to be flexible to engage the plurality of openings 20.

In one example, the locating elements 42c can be integrated together or coupled to the bottom surface 54 of the flange 52 of the tab module 14c. The tab module 14c can be mounted by a location-selectable connection to the splice tray 12. The pair of knob feet 56 of the locating elements 42c can be configured to engage one of the plurality of openings 20 in the splice tray 12 to mount the tab module 14c to the splice tray 12 at a selected mounting location defined by the plurality of openings 20. The selected mounting location being one of a plurality of different mounting locations defined by the plurality of openings 20 at which the tab module 14c can be mounted to the splice tray 12. The pair of knob feet 56 of the locating elements 42c can automatically fall into the plurality of openings 20 when the locating element 42c is pushed downwardly therein to create a snap-fit connection on the splice tray 12.

In certain examples, the tab module 14c can include a fiber containment wall 44c projecting upwardly from the front side 16 of the splice tray 12 when the tab module 14c is mounted to the splice tray 12. In one example, the fiber containment wall 44c can extend perpendicularly from the flange 52. In other examples, a fiber management tab 46c can project outwardly from the fiber containment wall 44c and oppose the front side 16 of the splice tray 12.

In some examples, the tab module 14c can be attached or mounted on the splice tray 12 anywhere inside of the perimeter 22 of the splice tray 12 as desired by the customer or end user. In one example, the tab module 14c can be mounted to the splice tray 12 by, for example, a clip-on connection, a friction-fit connection, or other type of connection. In certain examples, the tab module 14c can be releasably connected to the splice tray 12. In other examples, the tab module 14c can be permanently connected to the splice tray 12. The flange 52, fiber containment wall 44c, and the fiber management tab 46c of the tab module 14c can be designed to include a variety of tab module sizes for mounting on the splice tray 12.

Figure 11:
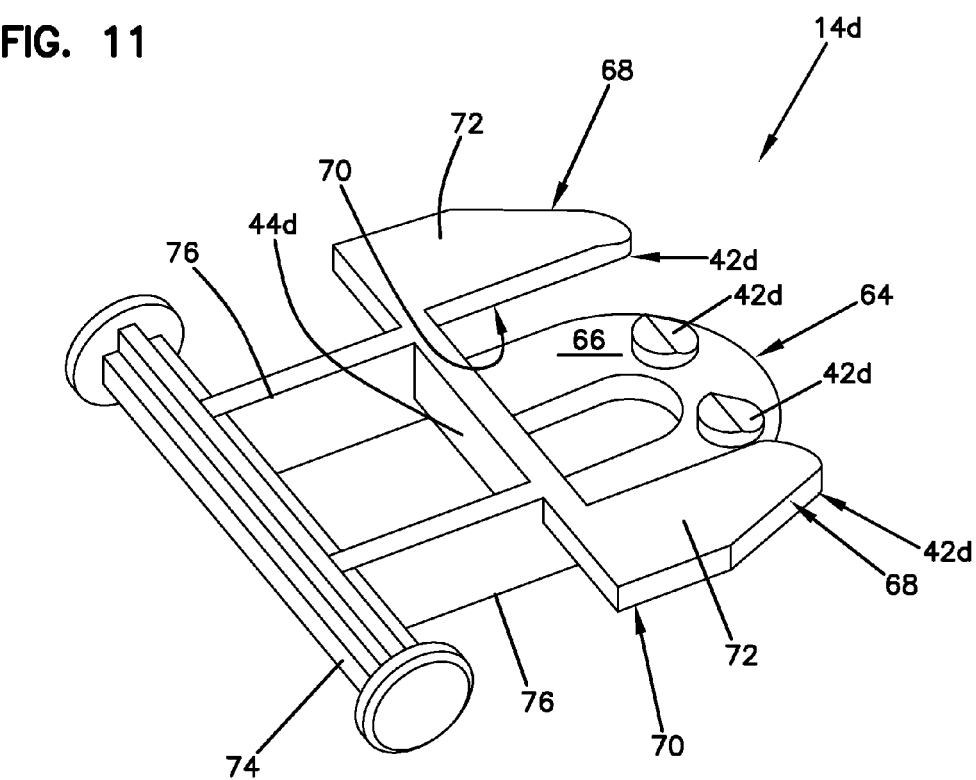
FIG. 11 is a perspective view of another embodiment of an attachment module that can be used with the fiber management structure shown in FIG. 1 in accordance with the principles of the present disclosure.

Referring to FIG. 11, an example of the hinge module 14d is shown. The hinge module 14d can include a base 64 having a top surface 66. The top surface 66 can include locating elements 42d configured to engage one of the plurality of openings 20 in the splice tray 12 to make a snap-fit connection for mounting the hinge module 14d to the splice tray 12 at a selected mounting location defined by the plurality of openings 20. The selected mounting location being one of a plurality of different mounting locations defined by the plurality of openings 20 at which the hinge module 14d can be mounted to the splice tray 12. In other examples, the hinge module 14d can be mounted to the splice tray 12 by a location-selectable connection.

In certain examples, the hinge module 14d can include forks 68 having an inner surface 70 and an outer surface 72. The inner surface 70 can include locating elements 42d thereon for mounting the hinge module 14d in one of the plurality of different mounting locations defined by the plurality of openings 20.

In other examples, the hinge module 14d can include a fiber containment wall 44d projecting upwardly from the front side 16 of the splice tray 12 when the hinge module 14d is mounted to the splice tray 12. In one example, the fiber containment wall 44d can extend perpendicularly to the forks 68.

In some examples, a pivot hinge 74 can project outwardly from the fiber containment wall 44d by two arms 76. The pivot hinge 74 can pivotally connect the splice tray 12 to a splice tray mount (not shown).

In certain examples, the hinge module 14d can be attached or mounted on the splice tray 12 anywhere around the perimeter 22 of the splice tray 12 as desired by the customer or end user. In one example, the hinge module 14d can be attached to the splice tray 12 by, for example, a clip-on connection, a friction-fit connection, or other type of connection. In certain examples, the hinge module 14d can be releasably connected to the splice tray 12. In other examples, the hinge module 14d can be permanently connected to the splice tray 12.

Figure 12:
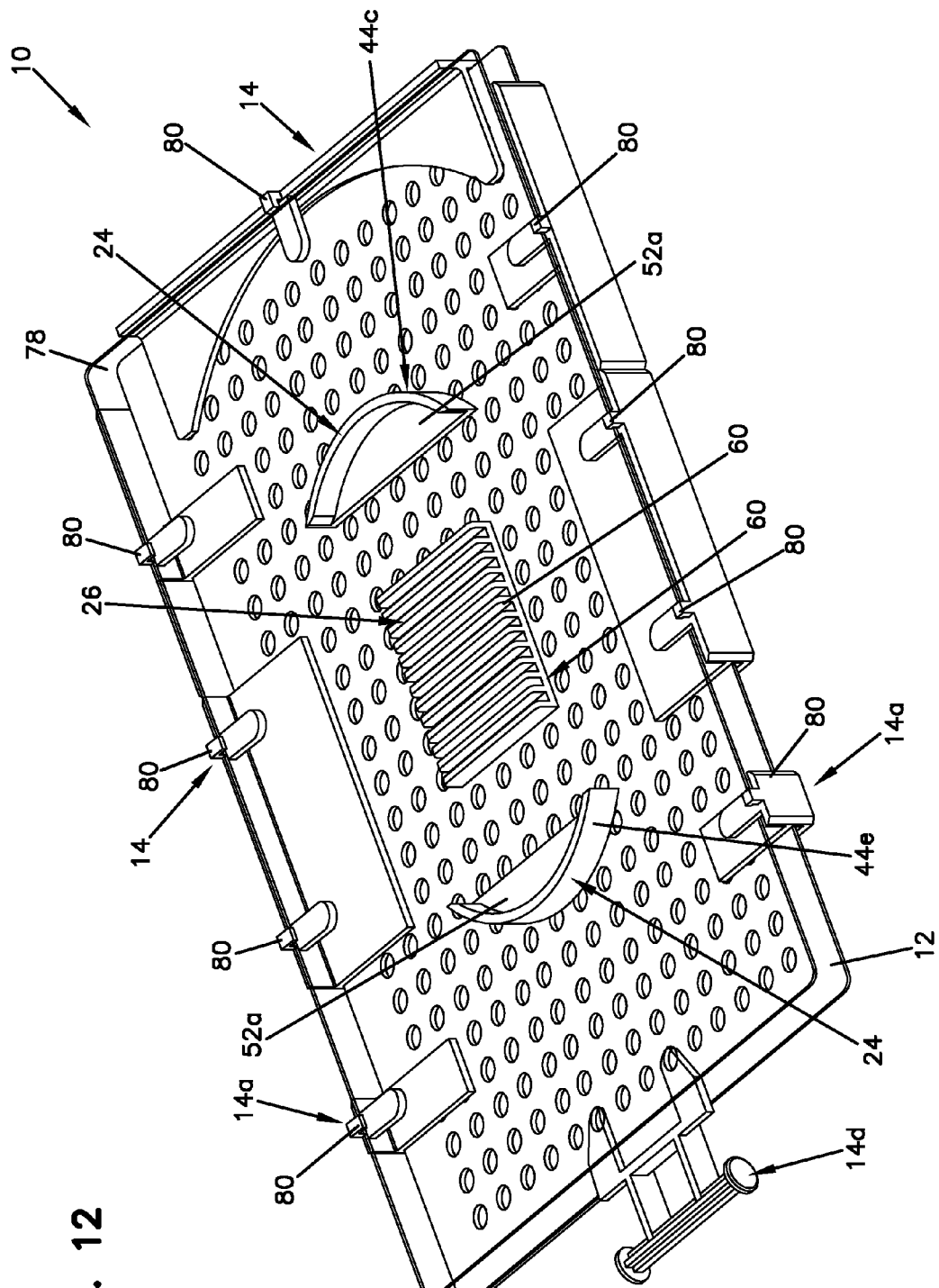
FIG. 12 is a perspective view of another embodiment of a fiber management structure including a cover in accordance with the principles of the present disclosure, attachment modules are shown attached to a splice tray of the fiber management structure.

Referring to FIG. 12, a perspective view of the fiber management structure 10 is shown including a cover 78. The cover 78 can be arranged and configured to fit over the fiber management structure 10 to cover and protect the plurality of attachment modules 14 and the fibers on the splice tray 12. The cover 78 can be used to help eliminate the exposure of the fibers and the plurality of attachment modules 14 to impacts and abrasive action. The cover 78 can be made of any material with elastic characteristics. In certain examples, the cover 78 may be a clear plastic, such as, polyvinylidene chloride (PVDC). In other examples, the cover 78 may be a clear plastic, such as, polyethylene (PE).

In one example, the plurality of attachment modules 14 can include a cover receptacle 80 for receiving an edge of the cover 78 to secure the cover 78 to the front side 16 of the splice tray 12.

In the depicted example, the fiber management structure 10 includes the curve bend radius limiter 24 and the splice holder 26 mounted on the splice tray 12. The curve bend radius limiter 24 can include a flange 52a having a bottom surface with locating elements thereon (not shown) and a fiber containment wall 44e similar to those described above. Accordingly, the description for the locating elements and the fiber containment wall 44e are hereby incorporated by reference in their entirety for the curve bend radius limiter 24. The locating elements of the curve bend radius limiter 24 can be configured to engage one of the plurality of openings 20 in the splice tray 12 to mount the curve bend radius limiter 24 to the splice tray 12 at a selected mounting location defined by the plurality of openings 20. The selected mounting location being one of a plurality of different mounting locations defined by the plurality of openings 20 at which the curve bend radius limiter 24 can be mounted to the splice tray 12. In other examples, the curve bend radius limiter 24 can be mounted to the splice tray 12 by a location-selectable connection.

In one example, the splice holder 26 can include a plurality of elongated slots 60 aligned adjacent to one another for receiving fiber cables. The splice holder 26 can include a bottom surface with locating elements (not shown) similar to those described above. Accordingly, the description for the locating elements is hereby incorporated by reference in its entirety for the splice holder 26. The locating elements of the splice holder 26 can be configured to engage one of the plurality of openings 20 in the splice tray 12 to mount the splice holder 26 to the splice tray 12 at a selected mounting location defined by the plurality of openings 20. The selected mounting location being one of a plurality of different mounting locations defined by the plurality of openings 20 at which the splice holder 26 can be mounted to the splice tray 12. In other examples, the splice holder 26 can be mounted to the splice tray 12 by a location-selectable connection.

Figure 13:
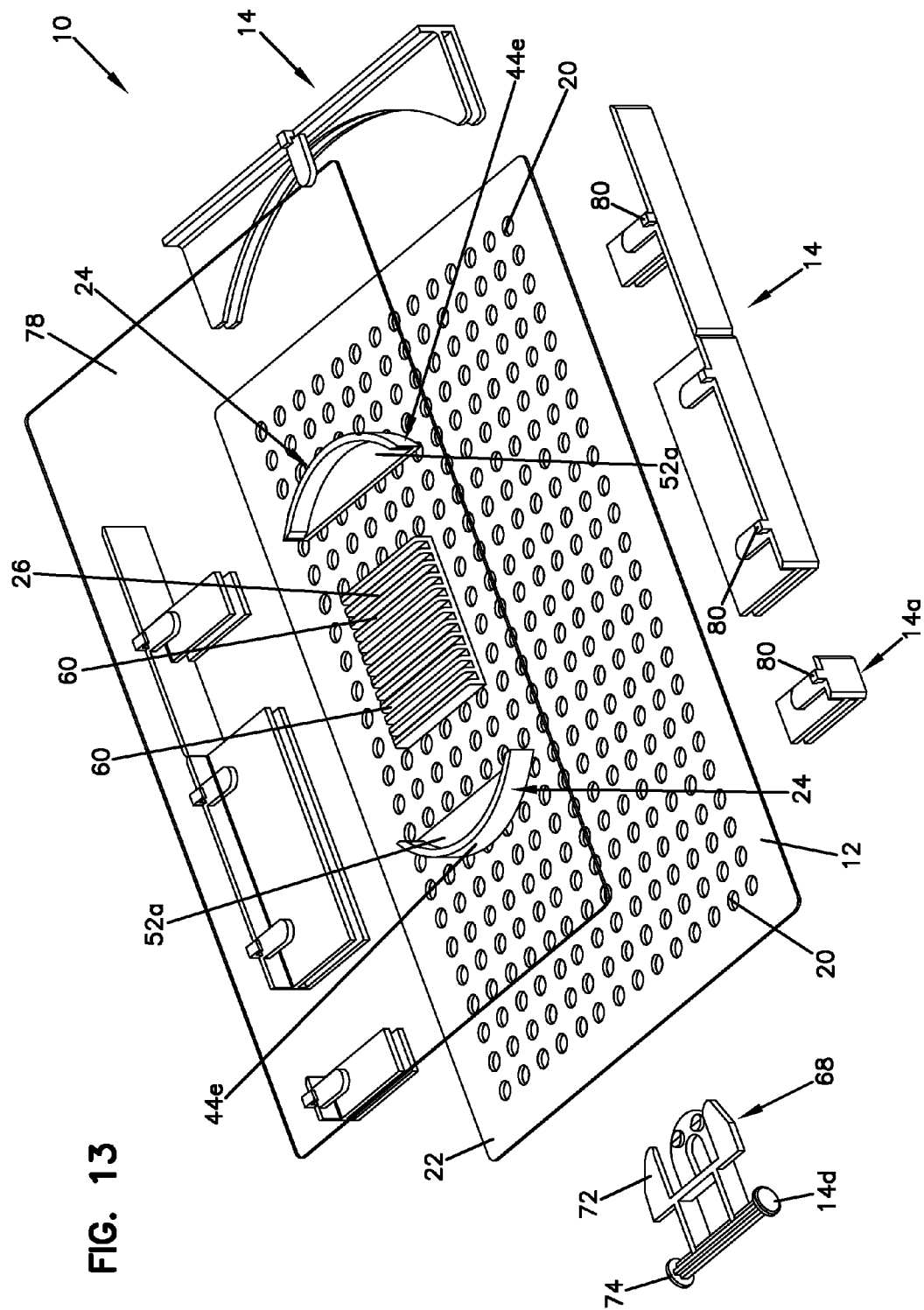
FIG. 13 is an exploded view of the fiber management structure of FIG. 12, the cover and attachment modules are shown in a position prior to being attached to the splice tray of the fiber management structure.

Referring to FIG. 13, an exploded view of FIG. 12 is shown. The splice tray 12 is shown with the cover 78 and the plurality of attachments 14 removed. In the depicted example, two curved bend radius limiters 24 are shown on the splice tray 12 along with the splice holder 26. The curved bend radius limiters 24 can help to protect the fibers from tangling or excessive bending. The curved bend radius limiters 24 and the splice holder 26 can be positioned within the perimeter 22 of the splice tray 12 at a selected mounting location defined by the plurality of openings 20.

From the forgoing detailed description, it will be evident that modifications and variations can be made without departing from the spirit and scope of the disclosure.

What is claimed is:

1. A fiber management structure comprising:
    a splice tray, the splice tray including a front side and a back side, the splice tray defining a plurality of openings that extend through the splice tray from the front side to the back side; and
    a first attachment module that mounts by a snap-fit connection to the splice tray at a selected mounting location defined by the plurality of openings, the selected mounting location being one of a plurality of different mounting locations defined by the plurality of openings at which the first attachment module can be mounted to the splice tray, the first attachment module including:
    a bottom wall and an opposite top wall, the bottom and top walls respectively having opposing inner surfaces that together define a cavity, each edge of the bottom wall being aligned with a corresponding edge of the top wall; and
    a fiber containment wall that projects upwardly from the front side of the splice tray when the first attachment module is mounted to the splice tray;
    wherein the splice tray is positioned within the cavity and locating elements of at least one of the bottom and top walls engage one of the plurality openings in the splice tray to permit the first attachment module to be mounted to the splice try at the selected mounting location.

2. The fiber management structure of claim 1, wherein the splice tray is less than 100 square inches.

3. The fiber management structure of claim 1, wherein the first attachment module includes a cover receptacle for receiving an edge of a cover to secure the cover to the front side of the splice tray.

4. The fiber management structure of claim 3, wherein the first attachment module includes snap-fit arrangement to receive the edge of the cover.

5. The fiber management structure of claim 1, wherein the attachment module mounts at a perimeter of the splice tray.

6. The fiber management structure of claim 1, wherein the attachment module mounts inside of a perimeter of the splice tray.

7. The fiber management structure of claim 1, wherein the splice tray is blank and planar prior to receiving the first attachment module.

8. The fiber management structure of claim 1, further comprising a second attachment module that attaches to the splice tray via at least one of the openings, the second attachment module including a pivot hinge for pivotally connecting the splice tray to a splice tray mount.

9. The fiber management structure of claim 8, further comprising a third attachment module that attaches to the splice tray via at least one of the openings, the third attachment module including a splice holder.

10. The fiber management structure of claim 9, further comprising a fourth attachment module that attaches to the splice tray via at least one of the openings, the second attachment module including a curved fiber bend radius limiter.

11. The fiber management structure of claim 1, wherein the fiber containment wall is planar.

12. The fiber management structure of claim 1, wherein a plurality of the first attachment module are attached to the splice tray.

13. The fiber management structure of claim 1, wherein the attachment module defines a slot for receiving an edge of the splice tray, wherein the attachment module includes at least one projection within the slot, and wherein the projection fits within one of the openings of the splice tray.

14. The fiber management structure of claim 1, wherein the first attachment module includes a fiber management tab that projects outwardly from the fiber containment wall and that opposes the front side of the splice tray.

15. A fiber management structure comprising:
    a splice tray, the splice tray including a front side and a back side, the splice tray defining a plurality of openings that extend through the splice tray from the front side to the back side; and
    an attachment module that mounts by a snap-fit connection to the splice tray at a selected mounting location defined by the plurality of openings, the selected mounting location being one of a plurality of different mounting locations defined by the plurality of openings at which the attachment module can be mounted to the splice tray, the attachment module including:
    a bottom wall being planar and constructed of a substantially non-rigid material, the bottom wall having an inner surface,
    a top wall being planar and constructed of a substantially non-rigid material, the top wall having an inner surface, the top wall having substantially a same height and a same width as the bottom wall such that each edge of the bottom wall is aligned with a corresponding edge of the top wall, and the bottom wall and the top wall define an interior cavity between the inner surface of the bottom wall and the inner surface of the top wall, and the bottom and top walls include locating elements positioned on the inner surfaces of the bottom and top walls;
    a fiber containment wall projecting upwardly from the front side of the splice tray when the attachment module is mounted to the splice tray; and
    a fiber management tab projecting outwardly from the fiber containment wall and opposing the front side of the splice tray;

wherein the splice tray is positioned within the interior cavity and the locating elements of the bottom and top walls of the attachment module engage one of the plurality of openings in the splice tray permitting the attachment module to be mounted to the splice tray at the selected mounting location defined by the plurality of openings.

16. The fiber management structure of claim 15, wherein the splice tray is less than 100 square inches.

17. The fiber management structure of claim 15, wherein the attachment module includes a cover receptacle for receiving an edge of a cover to secure the cover to the front side of the splice tray.

18. The fiber management structure of claim 17, wherein the attachment module includes snap-fit arrangement to receive the edge of the cover.

19. The fiber management structure of claim 15, wherein the attachment module mounts at a perimeter of the splice tray.

20. The fiber management structure of claim 15, wherein the attachment module mounts inside of a perimeter of the splice tray.

21. The fiber management structure of claim 15, wherein the splice tray is blank and planar prior to receiving the attachment module.

22. The fiber management structure of claim 15, further comprising a splice holder that attaches to the splice tray via at least one of the openings.

23. The fiber management structure of claim 15, further comprising a curved bend radius limiter that attaches to the splice tray via at least one of the openings.

24. The fiber management structure of claim 15, wherein the fiber containment wall is planar.

25. The fiber management structure of claim 15, wherein a plurality of the attachment modules are attached to the splice tray.

26. A fiber management structure comprising:
a splice tray, the splice tray including a front side and a back side, the splice tray defining a plurality of openings that extend through the splice tray from the front side to the back side; and
a first attachment module that mounts by a snap-fit connection to the splice tray at a selected mounting location defined by the plurality of openings, the selected mounting location being one of a plurality of different mounting locations defined by the plurality of openings at which the first attachment module can be mounted to the splice tray, the first attachment module including:
a flange having a bottom surface, the bottom surface including locating elements;
a fiber containment wall projecting upwardly from the front side of the splice tray when the first attachment module is mounted to the splice tray; and
a fiber management tab projecting outwardly from the fiber containment wall and opposing the front side of the splice tray;
wherein the locating elements of the first attachment module are configured to engage one of the plurality of openings in the splice tray permitting the first attachment module to be mounted to the splice tray at the selected mounting location.

27. The cable management structure of claim 26, wherein the splice tray is less than 100 square inches.

28. The fiber management structure of claim 26, wherein the first attachment module includes snap-fit arrangement to receive the edge of the cover.

29. The fiber management structure of claim 26, wherein the first attachment module mounts inside of a perimeter of the splice tray.

30. The fiber management structure of claim 26, wherein the splice tray is blank and planar prior to receiving the attachment module.

31. The fiber management structure of claim 26, further comprising a second attachment module that attaches to the splice tray via at least one of the openings, the second attachment module including a pivot hinge for pivotally connecting the splice tray to a splice tray mount.

32. The fiber management structure of claim 31, further comprising a third attachment module that attaches to the splice tray via at least one of the openings, the third attachment module including a splice holder.

33. The fiber management structure of claim 32, further comprising a fourth attachment module that attaches to the splice tray via at least one of the openings, the second attachment module including a curved fiber bend radius limiter.

34. A fiber management structure comprising:
a splice tray, the splice tray including a front side and a back side; and
a first attachment module that mounts by a location-selectable connection to the splice tray at a selected mounting location, the selected mounting location being one of a plurality of different mounting locations at which the first attachment module can be mounted to the splice tray, the first attachment module including:
a bottom wall and an opposite top wall, the bottom and top walls respectively having opposing inner surfaces that together define a cavity, each edge of the bottom wall being aligned with a corresponding edge of the top wall; and
a fiber containment wall that projects upwardly from the front side of the splice tray when the first attachment module is mounted to the splice tray;
wherein the splice tray is positioned within the cavity and locating elements of at least one of the bottom and top walls engage one of a plurality openings defined in the splice tray to permit the first attachment module to be mounted to the splice try at the selected mounting location.

* * * * *